United States Patent [19]

Samuelson

[11] Patent Number: 4,849,778

[45] Date of Patent: Jul. 18, 1989

[54] CAMERA SUPPORT SYSTEMS

[75] Inventor: David W. Samuelson, London, United Kingdom

[73] Assignee: Panavision, Inc., Tarzana, Calif.

[21] Appl. No.: 100,095

[22] Filed: Sep. 23, 1987

[30] Foreign Application Priority Data

Sep. 23, 1986 [GB] United Kingdom ................ 8622879

[51] Int. Cl.⁴ ............................................. G03B 17/00
[52] U.S. Cl. ..................................... 354/81; 354/293;
352/243; 248/281.1; 248/292.1; 248/364
[58] Field of Search ................. 354/81, 293; 352/243;
248/364, 292.1, 123.1, 159, 281.1, 188.8, 188.4,
176, 648

[56] References Cited

U.S. PATENT DOCUMENTS

| | | | |
|---|---|---|---|
| 1,831,346 | 11/1931 | Dina | 352/243 |
| 1,942,925 | 1/1934 | Jenkins | 248/123.1 |
| 2,156,862 | 5/1939 | Maugard | 248/123.1 |
| 2,224,901 | 12/1940 | Cunningham | 248/123.1 |
| 2,364,363 | 12/1944 | Howell | 352/243 |
| 3,598,355 | 8/1971 | English | 354/293 |
| 4,095,250 | 6/1978 | Giglioli | 354/293 |
| 4,247,067 | 1/1981 | Smith | 248/648 |
| 4,530,584 | 7/1985 | Schmidt | 354/293 |
| 4,657,220 | 4/1987 | Lindsay | 354/293 |

Primary Examiner—A. A. Mathews
Attorney, Agent, or Firm—Lyon & Lyon

[57] ABSTRACT

The camera support system includes a support column and a boom arm mounted for pivotal movement on the support column by means of a fulcrum unit. The boom arm includes extension members which are detachably interconnectable thereto for selectively changing the length of the boom arm. The extension members when not used in the boom arm being optionally interconnected in the support column to increase the height of the column. The fulcrum unit is interchangeable with an interface unit for directly mounting a camera to the top of the support column for monopod type operation. A base assembly for the support column of the system includes interchangeable feet, rollers or casters whose heights can be individually adjusted.

16 Claims, 7 Drawing Sheets

CAMERA SUPPORT SYSTEMS

This relates to support systems for motion picture cameras, television cameras and the like.

For many years there have been two popular means of supporting motion picture and television cameras. Firstly, there is the so-called monopod support column system, which is now often used in place of traditional tripods. Such monopod support columns typically comprise a set of interlocking tubes of various lengths adapted to be releasably interconnected whereby the camera may be mounted at a desired height. Such columns are usually used in combination with a heavy base unit and a top unit which serves as an adaptor between the top of the column and the underside of a mounting means or interface for a camera. A typically used such interface is the so-called "Mitchell" tripod adaptor which is well-known in the art.

The second commonly used type of camera support system is the so-called camera crane which includes a vertical support column which pivotally mounts a counterbalanced boom arm, the boom arm carrying the camera adjacent its free end. Camera cranes may either carry a camera operator to operate the camera, or the camera may be operated by remote control, the camera operator monitoring the picture via a remote television viewfinder. The crane boom arm is typically rotatable and pivotable on the support column, and the entire crane unit is also movable along the ground or on a track, the crane support system thus enabling a camera to be lowered, raised, panned, tilted, slewed and tracked as desired.

Known monopod and crane type camera support systems all have associated therewith the disadvantage of general lack of adaptability between different operating configurations. There is therefore a need for a more adaptable camera support system suitable for use in a number of operational situations.

Viewed from one aspect the invention provides a camera support system comprising a vertical support column and a boom arm mounted for pivotal movement on the support column, the free end of the boom arm being adapted to carry a camera, wherein the boom arm includes at least one extension member detachably interconnectable thereto to extend the length of the boom arm, such member also being detachably interconnectable with the support column whereby the total height of such column may be increased.

In a preferred embodiment, the system comprises a plurality of extension members, advantageously of differing lengths, each adapted either to be interconnectable in the boom arm or alternatively in the vertical support column. In this way, it will be appreciated that adaptability of the system to different operating configurations is improved since both the height of the support column and the length of the boom arm may be varied within certain limits depending on the number and length of the extension members provided.

In such a system it is important that suitable coupling means be provided whereby the extension members may readily but securely be interconnected with each other, with the support column and possibly with other elements of the system. Typically the extension members will be tubular, and various forms of coupling means are envisaged, for example bayonet fittings, and screw threaded locking rings. In the presently preferred embodiment, the coupling means comprises matingly engaging male and female parts which are clamped together by means of a threaded locking ring or nut. Preferably there is also provided a ratchet locking mechanism which co-operates with the ring or nut in its tightened condition to prevent unwanted loosening thereof, the ratchet mechanism being manually releasable when it is desired to disengage the nut or ring to permit separation of the parts. Key means are preferably provided so as to ensure that the interconnected members are appropriately orientated with respect to one another. Similar, compatible coupling means may be used to interconnect other elements of the system, whereby overall adaptability to different operating configurations may be further increased, as discussed in more detail below. The preferred coupling means provides a secure but readily engageable and releasable connection.

A central section of the boom arm which is pivotally mounted on the support column will typically be of stronger construction than the extension members since the central section has to withstand a higher bending moment owing to its greater distance from the camera. In a preferred arrangement, two or more central sections may be provided as part of the system, one to give a boom arm of maximum length, and the other to provide a more compact configuration. The sections may be provided with the preferred coupling means discussed above, whereby if desired the unused central section may also be interconnected in the support column so as to increase further the maximum vertical height of such column. As is traditional in a crane type support system, counter-balance weights are provided on the end of the boom arm remote from the camera, and in a preferred embodiment of the system disclosed herein a counter-balance weight assembly is connected to the boom arm by means of the same form of coupling means which is used to interconnect the extension members. In a preferred system, the counter-balance weight assembly comprises standard weight lifters' weights of the sort which are readily available from sports equipments suppliers, and in this way the need to transport a heavy plurality of weights from location to location with the system may be avoided with obvious advantage. Such weight lifters' weights may conveniently be assembled together to form a trolley like unit, the round weights forming the wheels of the trolley, and this is further advantageous to the extent that the counter-balance weight assembly may more conveniently be moved from place to place on a particular location when not mounted to the boom arm.

The means mounting the camera to the free end of the boom arm may take any convenient form, but again it is preferable that the coupling means whereby the camera mounting means is secured to the boom arm is compatible with the coupling means for interconnecting the extension members. In this way, in a configuration where the boom arm is extended by the provision of one or more extension members the camera mounting means may be readily connected to the complementary coupling means provided on the free end of the extension member which is furthest from the support column. In a preferred embodiment, the camera support means comprises a platform having an elongate "L" shape which is preferably adapted to be mounted either way up so as to increase slightly either the maximum possible height or lowness for the camera. As is traditional in a crane type camera support, such a support platform is pivotal about a horizontal axis with respect to the boom arm and is coupled to a fulcrum unit mounting the arm to the support column in such a way that the platform pivots in the equal and opposite sense to the boom arm itself whereby the camera remains horizontal regardless of the inclination of the boom arm. Where the boom arm may include one or more extension members, clearly there is a need to adapt the coupling means between the camera platform and the fulcrum to the different possible lengths of boom arm. This may conveniently be achieved in the present system by providing interengagable link members, e.g. rods or preferably wire cables, which match the lengths of the extension members of the boom arm. In this way, the link members can be joined together to form a total length which matches the chosen length of the boom arm.

The system preferably further comprises a slewing ring i.e. a rotational unit which enables the boom arm to be rotated. Preferably, the slewing ring is also interconnected with other parts of the system via similar coupling means to that used to interconnect the extension members and this further increases adaptability since the slewing ring may for example be interconnected directly with one end of an extension member when used in a vertical configuration to increase the height of the column support.

In a particularly advantageous system, the support column can be used directly to mount a camera whereby the system also provides a monopod type camera support.

Accordingly, viewed from a second aspect the invention provides a camera support system comprising a vertical support column, a fulcrum unit for pivotally mounting a boom arm to the support column, and a camera interface unit for directly coupling the support column to a camera, said fulcrum and interface units being interchangeably interconnectable with the upper end of the support column whereby the system may be used either in a crane type or in a monopod type configuration.

Such an arrangement represents a new departure from known crane and monopod type supports which previously have constituted separate items of equipment, and the advantages of the present system over such earlier proposals as regards versatility, transportation and storage are self-evident. Preferably the interface unit includes a "Mitchell" tripod adapter of a type well known in the art.

In a preferred system, the adaptability provided by the second aspect of this disclosure is combined with the provision of extension members in accordance with the first aspect, compatible coupling means being used throughout the system, i.e. to interconnect the support column with either the fulcrum unit or camera interface as required and to engage the extension members with each other and with other parts of the system.

In a preferred embodiment a main column member forming part of the support column is itself of adjustable length enabling fine adjustment of the camera height. Advantageously the system may include a second column member whose length is also adjustable, which may either be interconnected with the support column to increase its maximum possible height, or may alternatively be used to support the boom arm in the crane mode adjacent the camera end thereof before or while the counterbalance weight assembly is attached.

It is generally necessary to provide a suitable base assembly for mounting the vertical support column, and a further important aspect of the system disclosed herein relates to a base assembly which is also intended to increase the ability of the system to be adapted to different operating configurations.

Thus, viewed from a third aspect the invention provides a base assembly for mounting a support column in a camera support system, such base assembly comprising means for interchangeably mounting thereon ground engaging feet and/or ground engaging multi-directional castors and/or track following rollers, such means being arranged so that the height of at least one said foot, castor, or roller with respect to the base assembly may be individually adjusted.

Such a base assembly or "dolly" is advantageous since it may be adapted to different operating requirements. Firstly, the assembly may be provided with three or more feet whereby the assembly may be stood on and, if necessary, firmly secured to the floor as required for certain types of filming. Secondly, castors may instead be provided which enable the assembly easily to be moved in any desired direction. Preferably, the castors are provided with brake means to restrain movement about both their pivotal and rotational axes so that the assembly can be set in a desired position. Finally, one or more of the castors can be replaced with a roller adapted to follow a suitable track provided on the ground. In this way, the assembly can be moved during filming along a predetermined path.

In a preferred embodiment, bogey type track following rollers may be provided, each of which consists of pairs of rollers orientated preferably at 90° to one another thus defining an inverted "V" adapted to engage over a suitable brack provided on the ground. In such an embodiment, the assembly may be used with traditional tracking, or alternatively may be used with any suitable circular tubing, for example plastic hose pipe or scaffold rails.

Since the height of at least one and preferably all of the rollers, castors or feet may be adjusted individually, the operating configurations may be readily varied. For example, two bogey type track rollers can be fitted to one side of the assembly, and then one or more castors can be adjusted to the appropriate height having regard to the height of the track used, on the other side of the assembly whereby the assembly may be appropriately levelled. Alternatively, all the castors may be replaced by track following rollers, which again may be adapted in height to accommodate the height of the track concerned whilst ensuring that the assembly is level and that the support column is vertically orientated. A further advantage of providing height adjustable rollers, castors or feet is that the support column may be set vertically irrespective of the ground level (within practical limitations) without the need to provide a separate levelling unit between the support column and the camera, as is current practice.

In a preferred embodiment, the assembly comprises three or four horizontally disposed legs extending outwardly from a central support member to which the column base is secured. In a preferred embodiment, the legs are pivotally mounted at their inner ends so that the assembly can be folded into a more compact configuration for transportation and/or storage, or for setting up in an awkward or confined space. A preferred camera support system might be provided with both a three legged and a four legged base assembly, the three legged assembly being more readily transportable and particularly suitable for use on undulating ground, and the four legged assembly providing a more stable base for use with a particularly high camera or when in the crane configuration the camera overhangs the center of gravity.

The base assembly in accordance with the third aspect of this disclosure may of course be used in conjunction with an adaptable system in accordance with the first and second aspects, in which case the base assembly is also preferably provided with coupling means which is compatible with the coupling means used to interconnect the other parts of the system.

As discussed above, a rotatable slewing ring is preferably incorporated in the support column which enables the upper part of the column to be rotated about the column axis. Such a slewing ring may also be used to mount a seat for a camera operator. In such a configuration, the slewing ring could be provided with two opposed couplings (preferably of the type used to interconnect the other parts of the system), one of which supports a seat for the camera operator and the other, on the other side, mounts the camera. In this way, the camera and camera operator in the monopod configuration rotate in unison, and this configuration is often favoured by television cameramen. In a different type of system, the camera operator, and possibly the focus assistant, may instead be mounted on seats which are rotatable relative to the camera support column, in which case the seats are instead carried by the column base assembly rather than by a slewing ring.

Preferred embodiments of the invention will now be described in more detail, but by way of example only, with reference to the accompanying drawings, wherein:

FIG. 7a illustrates a preferred extensible column member adapted to be interconnected in the vertical support column;

FIG. 7b is a sectional view taken on the line VIIb—VIIb in FIG. 7a.

FIG. 8a illustrates a further type of extensible column member which may also form part of the system; FIG. 8b is a section on an enlarged scale of part of the member shown in FIG. 8a as viewed from arrows VIIIb;

Figures 1, 1A, 1B:
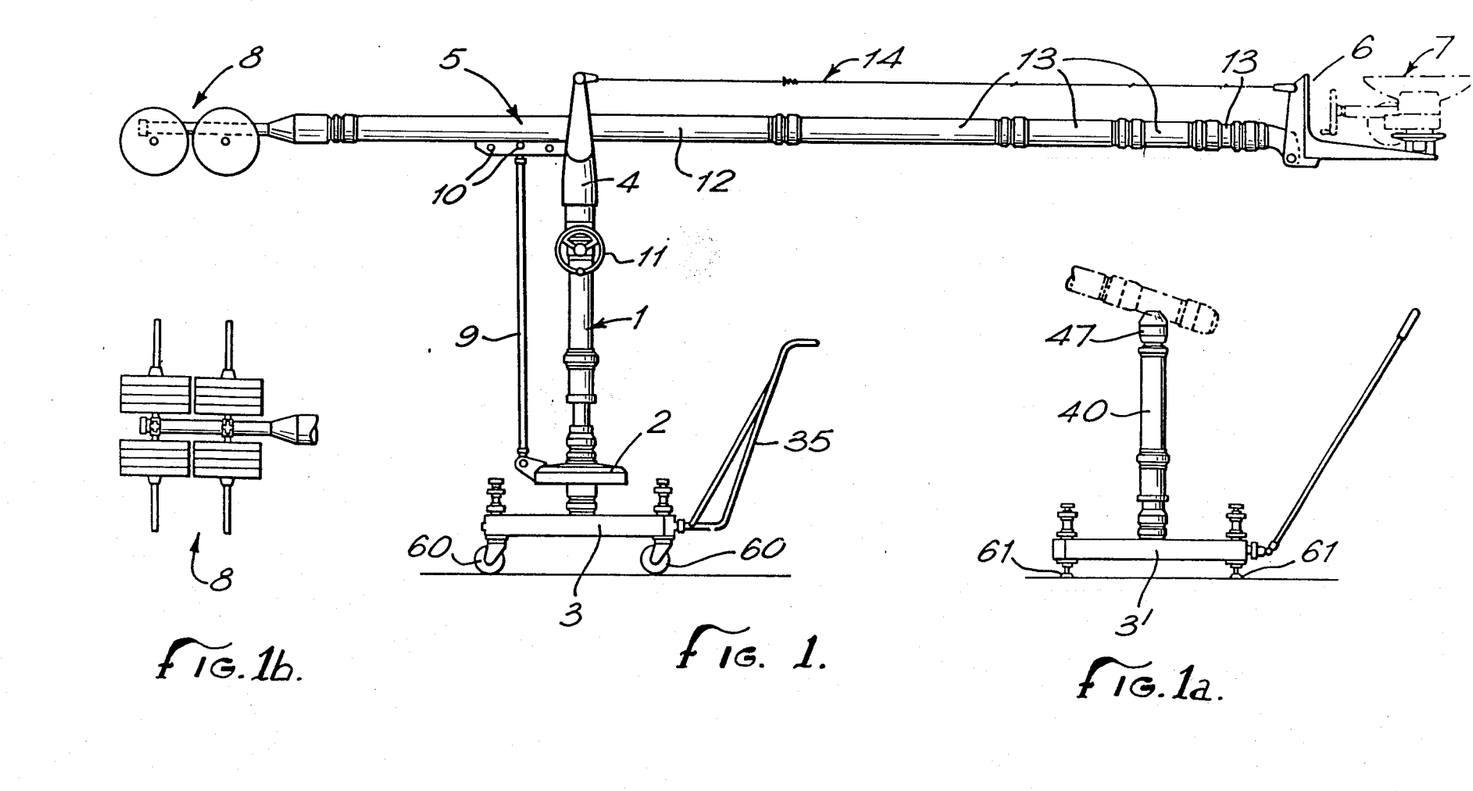
FIG. 1 is a schematic side elevation illustrating components of the system interconnected to provide a crane type camera support.
FIG. 1a is an elevation view similar to FIG. 1 and illustrating a different arrangement of the crane type camera support.
FIG. 1b is plan view of the counter-balance weights for the crane type camera support of FIG. 1.

Referring firstly to FIGS. 1, 1a and 1b a camera support system is shown assembled to provide a crane type camera support. The system comprises a vertical support column 1 of adjustable height secured at its lower end via a rotatable slewing ring 2 to a base assembly 3. A fulcrum unit 4 mounted to the upper end of the support column 1 pivotally mounts a boom arm 5 to the free end of which is pivotally mounted an elongate "L"shaped platform 6 which carries camera mounting means 7. A counter-balance weight assembly 8 is mounted to the other 20 end of the boom arm 5. A tension rod assembly 9 extends between the slewing ring 2 and the fulcrum unit 4 whereby the boom arm may be pivoted and the camera raised or lowered as desired by adjusting the length of the support column 1 (see FIG. 2). The tension rod 9 may be connected at different axial spacings from the pivot axis three attachment points 10 are shown in FIG. 1) whereby the leverage, range and speed of movement of the boom arm with respect to height adjustments of the support column caused by turning of an operating wheel 11 may be varied.

The means 7 for mounting a camera to the L-shaped platform 6 will not be described in detail since various such means are known in the art and can be used in conjunction with the illustrated support system. Preferably, however, there is provided a pan and tilt tripod head known as the "Panahead" which enables the camera to be panned and tilted on the platform. There may also be provided means whereby the camera may be rotated about its optical axis as well as panned and tilted about the lens entrance pupil. It is also a preferred feature of the support system that the elongate "L" shaped platform can be inverted as compared with the condition shown in FIG. 1 so that the maximum possible height of the camera is slightly increased by a distance corresponding to the length of the shorter limb of the "L" shape.

Figures 2, 4A:
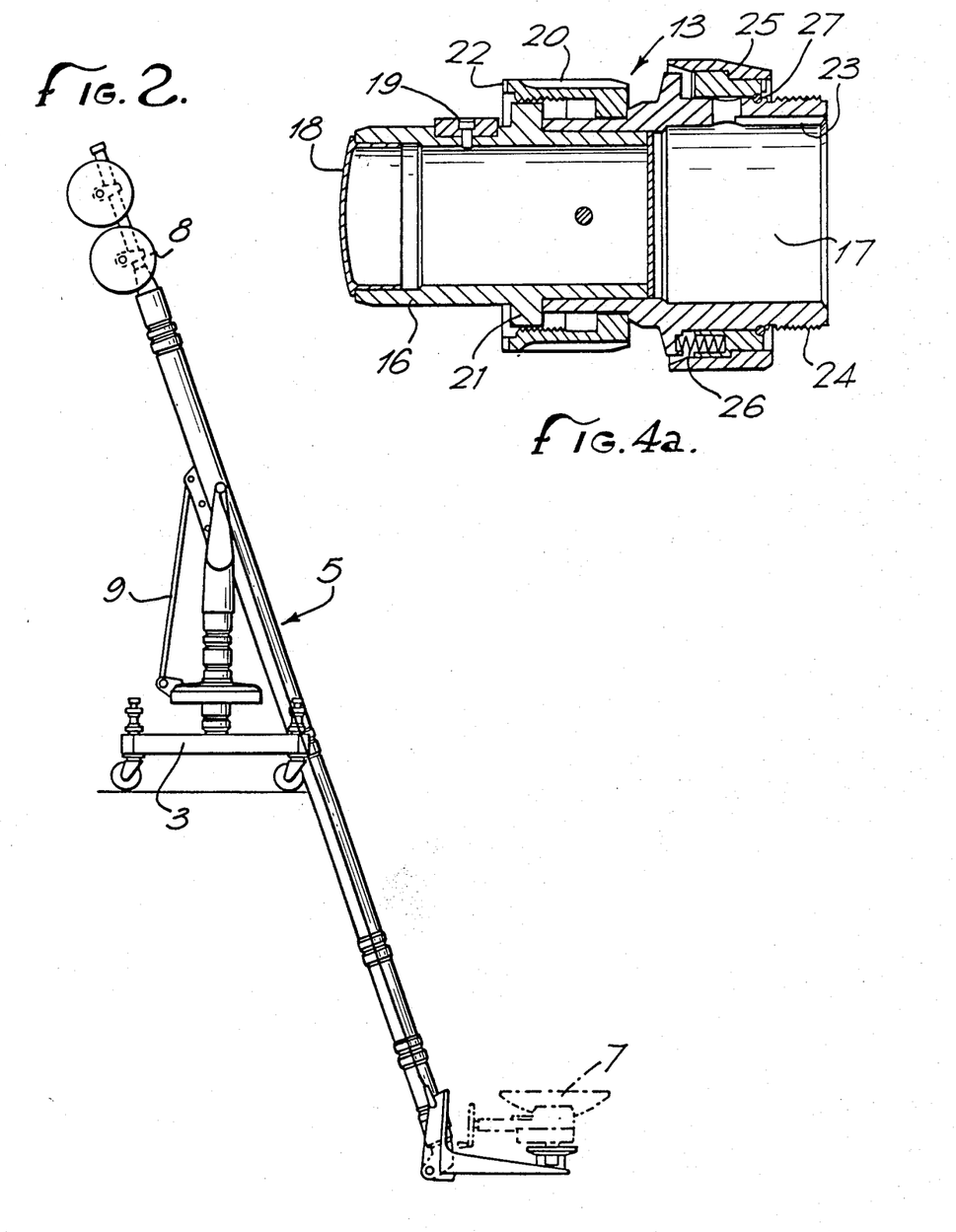
FIG. 2 is a view similar to FIG. 1, illustrating the camera in a lowered position.
FIGS. 4a and 4b show in longitudinal cross-section on an enlarged scale respectively short and longer extension members, illustrating a preferred form of coupling means for interconnecting such members with each other and with other parts of the system.

The various units of the system assembled to form the crane type support illustrated in FIG. 1 will now be described in more detail. The boom arm 5 of the support is formed of a central tubular section 12 and of four tubular extension members 13 of differing lengths. In a preferred system, extension members 13 are provided having lengths of 32 inches, 16 inches, 11 inches and 5 inches. The extension members 13 are interconnected with each other, with the camera support platform 6, and with the central section 12 of the boom arm by a common coupling means of the system described in more detail below. It will thus be appreciated that the length of the boom arm may be reduced by removing one or more of the extension members 13. As is traditional in a crane type support, a link member 14 extends between an upper part of the fulcrum unit 4 and the top of the camera support platform 6 whereby, as shown in FIG. 2, the platform is kept level regardless of the inclination of the boom arm 5. Since in the illustrated system the length of the boom arm may be varied, there is a need to adapt the link member accordingly, and this is achieved in the preferred system by providing a plurality of interengagable link members formed e.g. of wire cable whose lengths correspond exactly to the lengths of each of the extension members. Thus, by interconnecting the link members it is possible to provide an overall length matching the length of the boom arm.

Figure 3:
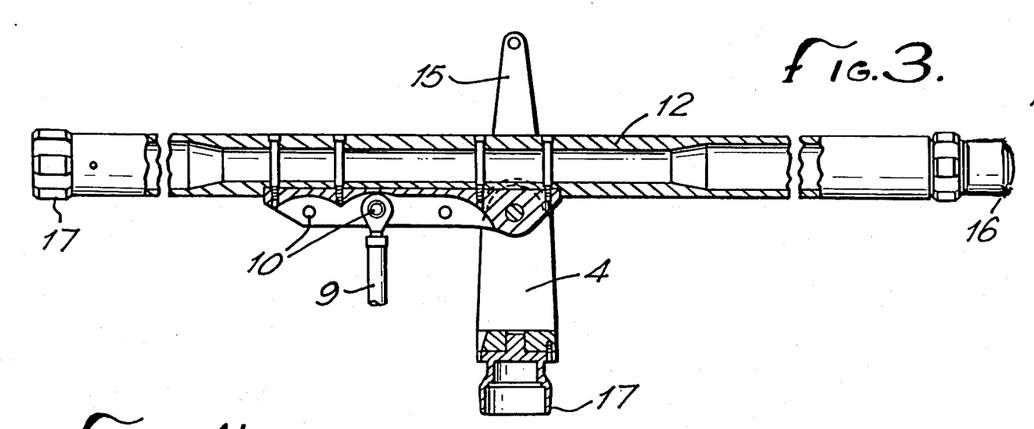
FIG. 3 illustrates on an enlarged scale the central section of the boom arm together with the fulcrum unit for connecting such arm to the support column.
Figure 3A:
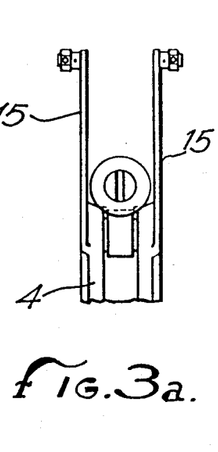
FIG. 3a is an end elevation view of the boom arm shown in FIG. 3.

As shown in FIGS. 3 and 3a, the fulcrum unit 4 comprises arms 15 extending upwardly on either side of the boom arm central section 12 so as to define a cradle for receiving the boom arm section 12 in a pivotal manner. The boom arm section 12 is tubular, but includes a thickened wall in its central region to avoid bending under the weight of the camera, the moment of which is greater in the central region. The central section 12 of the boom arm also includes male and female coupling parts 16,17 respectively which are compatible with the coupling means of the extension members 13 discussed in more detail below. The fulcrum unit 4 includes a similar female coupling part 17 whereby the unit is mountable on the top of the vertical support column 1.

Figure 4B:
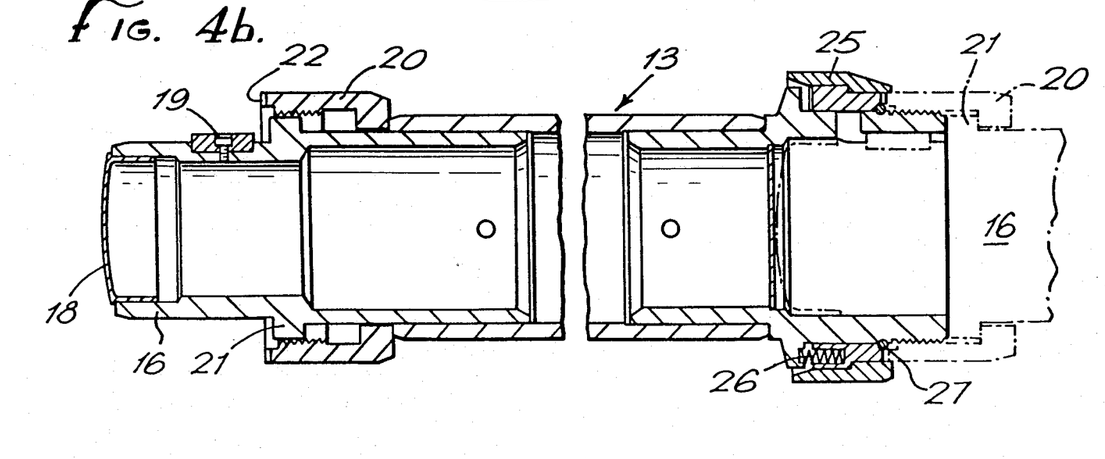

Turning now to FIGS. 4a and 4b, shorter and longer extension members 13 are respectively illustrated in more detail. Each includes a male coupling part 16 at one end and a complementary female part 17 at the other end. The male part is provided with a dust cover 18 and on its outer periphery includes a key 19. A rotatable internally threaded locking nut 20 is mounted adjacent the male part and is axially slidable behind a retaining flange 21. In a preferred design the thread has a multiple start to make it easier and quicker to engage and tighten. The front edge of the nut 20 is provided with ratchet teeth 22 for the purpose described below.

Figure 4C:
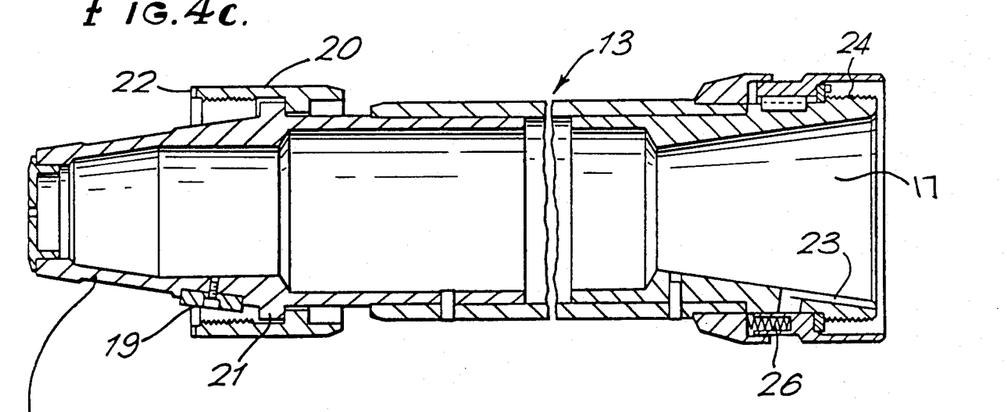
FIG. 4c illustrates a modified form of coupling means.

The female coupling part 17 provided on the 35 other end of each extension member is adapted to receive the male part of an adjacent extension member, or of a different element of the system, the female part 17 including on its outer periphery a keyway 23 which must be aligned with the key 19 of the male part before the male part can be inserted. In this way, correct circumferential alignment of the interconnected members can be ensured. As shown in phantom lines on the right hand side of FIG. 4b, the male part of one member is inserted into the female part of the adjacent member until the flange 21 abuts the front edge of the female part 17. The nut 20 may then be engaged with an external thread 24 provided on the outer surface of the female part so that the adjacent members are clamped together. In order to prevent unwanted loosening of the nut 20, a locking ring 25 is provided on the female part, which ring is spring biased by means of coil springs 26 rightwardly as shown in FIGS. 4a and 4b against a circlip 27. The locking ring 25 also includes ratchet teeth around part or all of its front edge. Thus, as the nut 20 is fully tightened the ratchet teeth 22 on its front edge engage those on the opposed front edge of the locking ring 25, the teeth being orientated to allow relative movement in the tightening sense but to restrain any movement in the unlocking sense. Thus, in the tightened condition, the ratchet mechanism prevents loosening of the nut 20, which can only be undone by manually displacing the ring 25 leftwardly against the spring biasing force so that the ratchet teeth are disengaged. As shown in FIG. 4c a modified form of coupling means includes tapered male and female coupling parts 16,17. Such an arrangement improves ease of alignment of the parts and avoids airlocks being formed in the members during engagement. Otherwise the coupling means of FIG. 4c is similar to that shown in FIGS. 4a and 4b.

It is an advantageous feature of the illustrated system that the extension members 13, when not used to increase the length of the boom arm 5, may alternatively be interconnected in the support column 1. Thus, the upper end of the support column member 1' (illustrated in more detail in FIGS. 7a and 7b) includes compatible coupling means including a male connecting part 16 and locking nut 20. Similarly, as discussed above, the lower part of the fulcrum 4 includes a complementary female coupling part, whereby one or more of the extension members may readily be interposed between the support column member 1' and fulcrum 4 so as to increase the total height of the column 1.

Figures 5, 6:
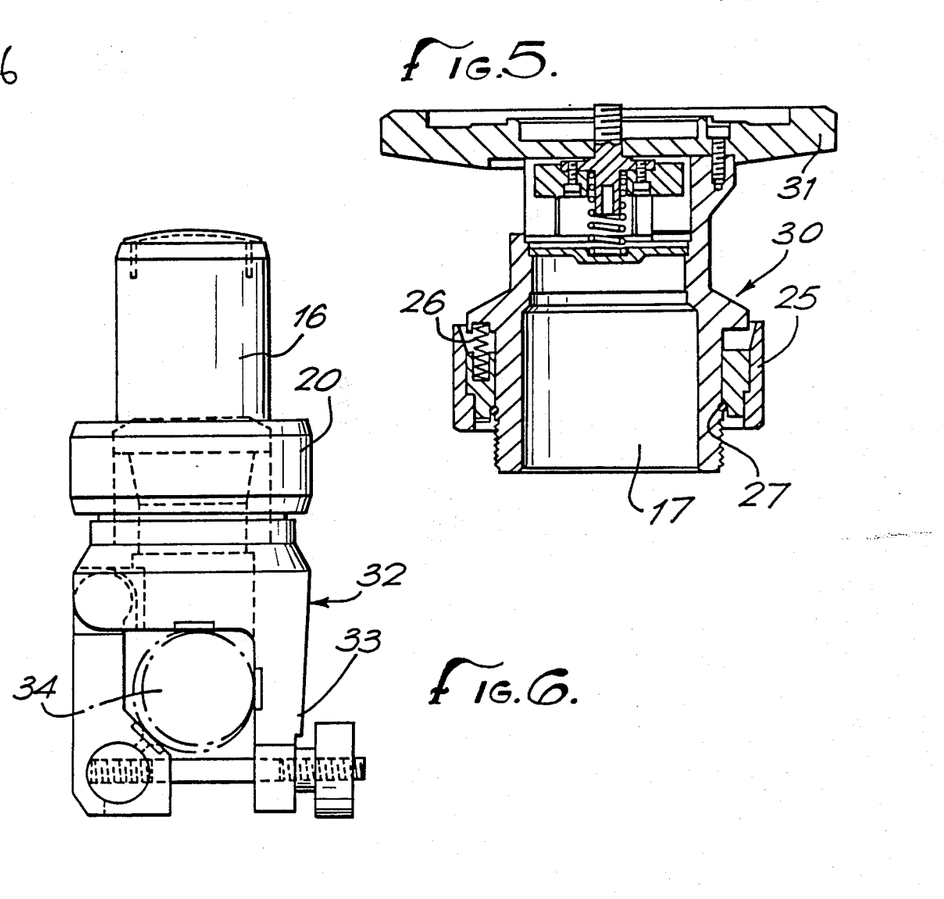
FIG. 5 illustrates in cross-section a camera interface unit adapted to be secured to the support column shown in FIG. 1, whereby the system instead provide a monopod type support.
FIG. 6 illustrates an adaptor whereby parts of the system may optionally be secured to a scaffold bar.

It is also an advantageous feature of the illustrated system that the system may alternative provide a monopod type support. Thus, as shown in FIG. 5, there is also provided an interface unit 30 which on its underside comprises a female coupling part adapted to be interconnected with the top of the support column member 1' or with one or more extension members 13 mounted thereon, and which on its upper side mounts a known "Mitchell" tripod adapter for connection to a camera pan and tilt head. Thus, the system shown in FIG. 1 may readily be adapted to provide a monopod support having a variety of different possible heights. In a preferred form of the system, a further central section (not shown) of the boom arm may be provided of different length, and both such sections may be used in the support column in the monopod mode of operation so that if desired a particularly high camera mounting may be achieved.

As shown in FIG. 6, the system may also include a scaffold adapter 32 which at one end includes a male coupling part 16 and at the other end includes a clamping means 33 adapted to be secured e.g. to a scaffold bar 34. Such an adapter enables, for example, the interface unit 30 shown in FIG. 5 alternatively to be mounted to either a horizontally or vertically set scaffold or similar tubing e.g. of approximately 2" in diameter, either by direct coupling to the unit 32 or with one or more extension members 13 interposed therebetween.

The counter-balance weight assembly 8 as shown in the plan view in FIG. 1b comprises standard weight lifters' weights, the round weights of which are mounted about parallel axes, and in this way the weights form an assembly which may be readily wheeled from place to place when not secured to the boom arm 5. The counter balance weight assembly is conveniently attached to the boom arm 5 via the same mating coupling means used to interconnect other parts of the system. A tow-bar 35 used to move the base assembly 3 from location to location may conveniently also be adapted for engagement with the weight unit so that such assembly may readily be moved from place to place.

Figures 7A, 7B, 8A, 8B:
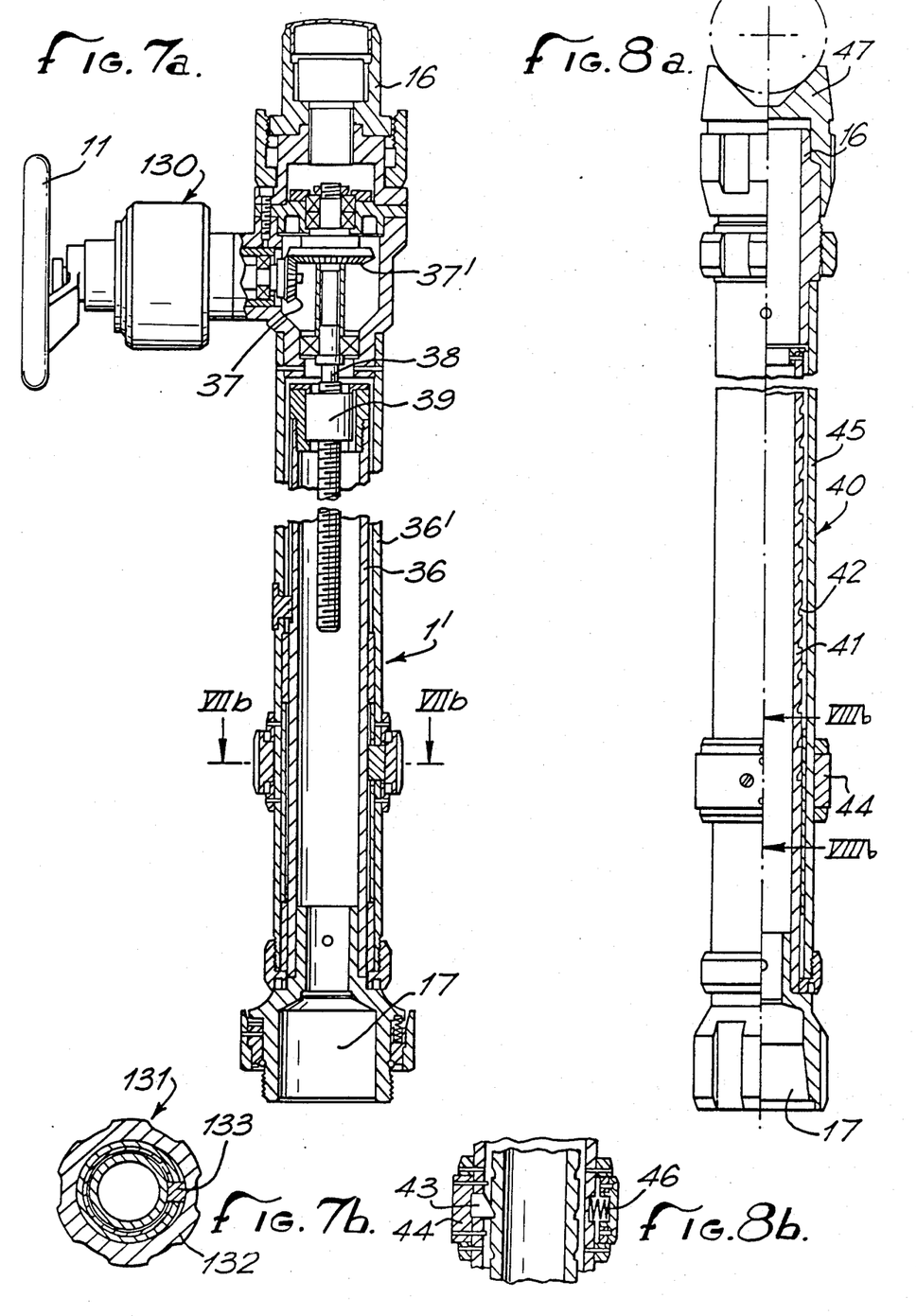

Referring now to FIG. 7a a main, extensible support column member 1' is shown in cross-section. The column member comprises inner and outer tubes 36,36' which are telescopically engaged. The operating handle 11 shown in FIG. 1 is coupled to an input gear 37 via a clutch mechanism 130. The input gear 37 co-operates with a crown gear 37' carried by the outer tubular member 36' and drivingly coupled to a threaded rotating stud 38. The stud 38 is threadedly engaged with a bush 39 carried by the inner member 36, whereby rotation of the gears 37 and 37' effect relative longitudinal movement between the stud 38 and bush 39 and thus between inner and outer members 36,36'. The clutch mechanism 130 is adapted to transmit torque from the handle to the input gear 37 to cause rotation of the gear 37, but is effective to prevent rotation of the gear 37 consequent upon torque being applied thereto via the crown gear 37'. In this way it will be appreciated that the column member is prevented from lowering itself as a result of the weight of the load supported thereby. As shown in FIG. 7b, the column member also includes a locking means 131 comprising a rotatable collar 132 having a slightly off circular aperture arranged to cooperate with a locking stud 133 slidably mounted to the outer tube 36' and engageable with the inner tube 36. Thus, by rotation of the collar 132 the stud 133 becomes tightly clamped against inner tube 36 whereby relative movement between the tubes is prevented and a particularly rigid fixed height support may therefore be provided.

A further advantageous component of the system is shown in FIGS. 8a and 8b. This is a telescopic column member 40 whose length can be adjusted, and which again is provided at its respective ends with male 16 and female 17 coupling parts. The height adjusting mechanism of the column member 40 differs from that of the main support column member 1' to the extent that the inner tubular member 41 is provided with ratchet notches 42 longitudinally spaced along its outer periphery, and these are engagable with a pawl 43 carried by a spring biased operating ring 44 carried by the outer tubular member 45. Thus, the inner tubular member may be extended to a desired height with the ring 44 manually biased leftwardly against the biasing force of spring 46 as shown in FIG. 8b, and release of the ring causes the pawl 43 to engage the appropriate notch 42 whereby the column member is maintained in an extended condition. As shown in FIG. 8a, the column member 40 is provided with a "V" block engaged with the male part 16 at the upper end of the column 40. The "V" block 47, as shown in FIG. 1, is used to support the boom arm 5 in the crane mode of the system before or while the counterbalance weight unit 8 is secured thereto. In this configuration, the column member 40 is mounted to a further column base assembly 3' of the system. The telescopic column member 40 can alternatively be mounted in the support column 1 to provide a still further increase in the maximum possible height of the column.

As shown in FIGS. 9–14, the illustrated system includes two column base assemblies, a three legged assembly 3' and a four legged assembly 3. Each assembly is provided adjacent its centre with the male part 16 of the coupling means used to interconnected the other parts of the system. As shown in FIG. 1, the base assembly 3 mounts the slewing ring 2 which ring is thus provided with a downwardly projecting female coupling part and an upwardly projecting male part.

Figure 13A:
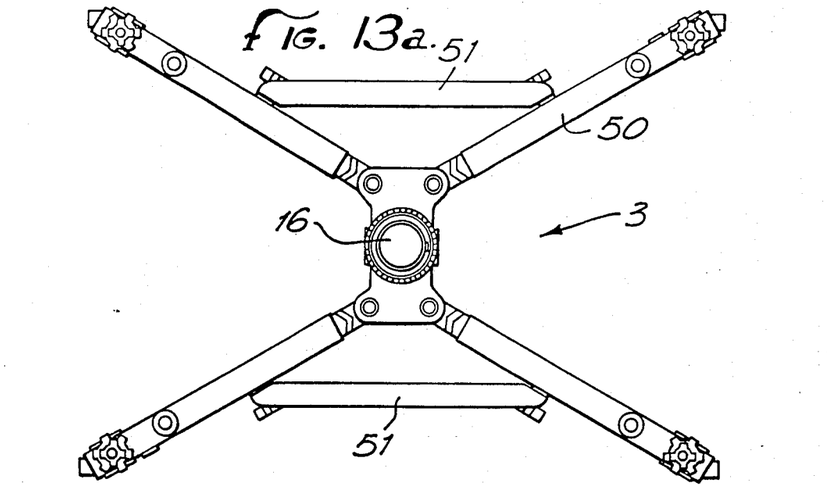
FIGS. 13a and 13b illustrate in plan view a four legged form of support column base assembly both in its operational and folded away configurations.
Figure 13B:
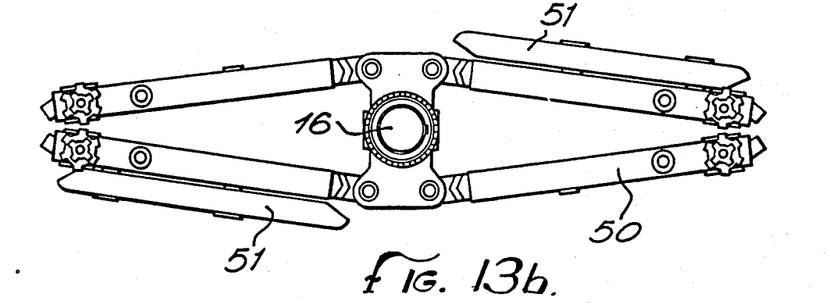

Both base assemblies comprise horizontally extending legs 50 which are pivotal about vertical axes whereby each assembly may be folded into a more compact configuration for transportation and/or storage as shown in the drawings. Bracing members 51 are releasably interconnectable with the legs 50 as shown in FIGS. 9 and 13 whereby the legs may be retained in their outwardly projecting configurations in use.

Figures 9, 10, 11, 12:
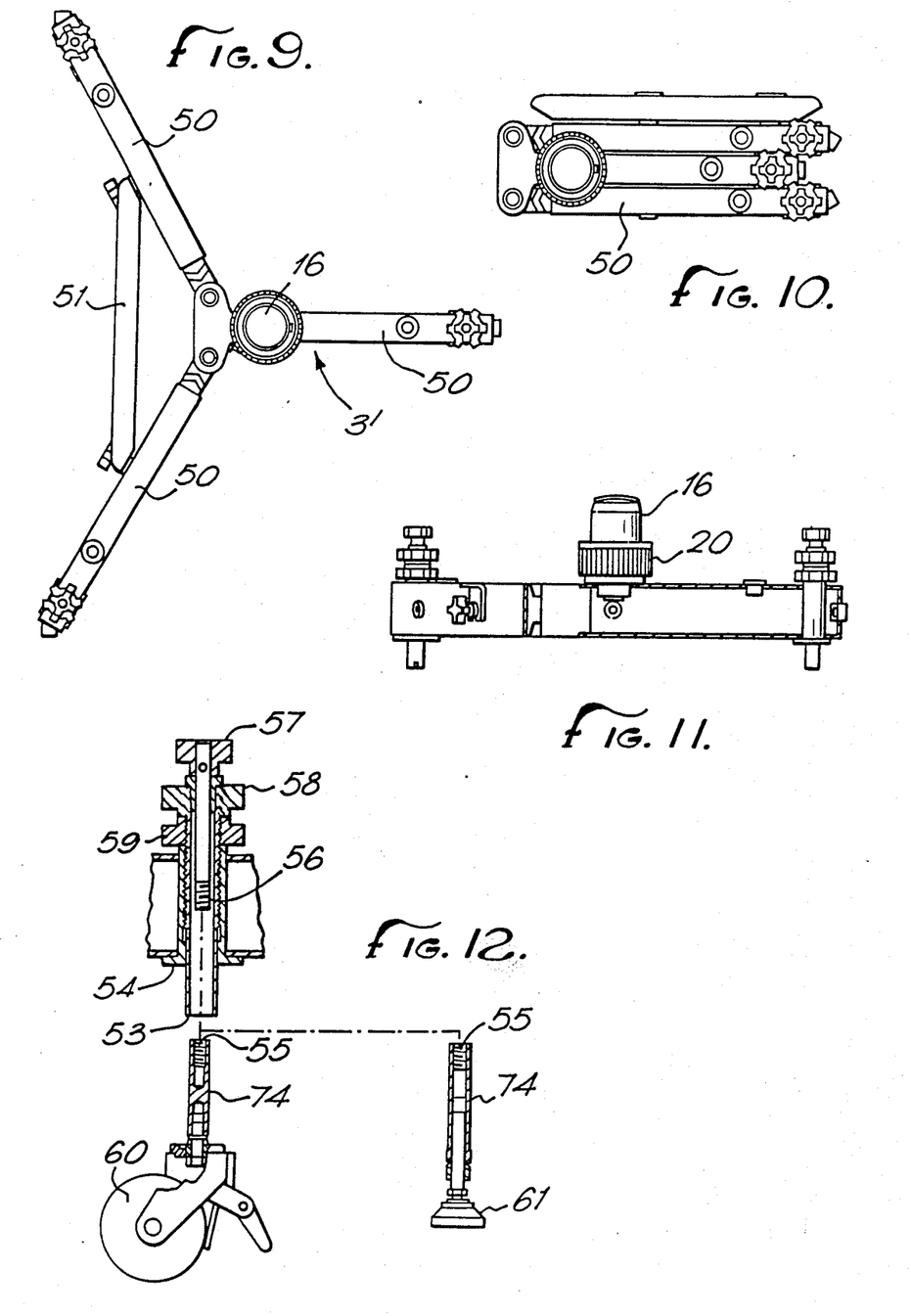
FIG. 9 illustrates in plan view a three legged support column base assembly.
FIG. 10 illustrates the assembly of FIG. 9 folded up for transportation and storage.
FIG. 11 illustrates the assembly of FIG. 9 in side elevation.
FIG. 12, is a side elevation illustrating the which ground engaging feet, castors or rollers may be interchangeably mounted to the base assembly.

As shown in FIGS. 11 and 12, the base assemblies are provided with tubular sockets 53 which are threadedly engaged in sleeves 54 extending through each leg of the assembly, the sockets 53 receiving studs 74 of either castors, ground engaging feet, or track following roller assemblies (FIG. 14). Each stud 74 includes a threaded bore 55 which, when the stud is inserted in a respective socket 53, threadedly engages a screw 56 connected to an upper knob 57 whereby a castor, foot or roller assembly may be securely mounted to the under side of the base assembly by tightening the knob 57. Since the socket 53 itself is threadedly engaged with the sleeve 54, the height of the castor, foot or roller assembly may be adjusted with respect to the base assembly by turning a second knob 58 which is fixedly secured to the socket 53. A third knob 59 which is threadedly engaged around the upper part of the socket 53 acts as a lock nut and is tightened down against the upper surface of the respective leg of the base assembly once the socket is at its required height.

Figure 14A:
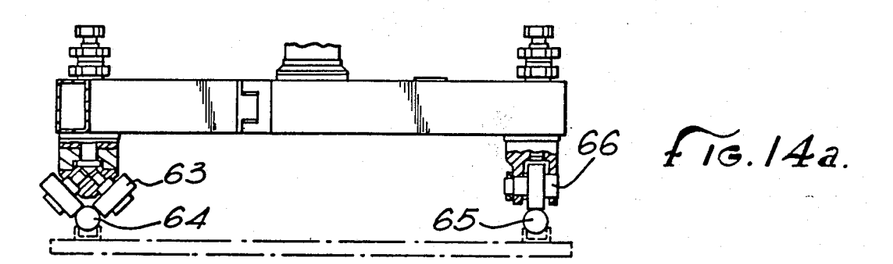
FIGS. 14a, 14b, 14c, 14d, and 14e illustrate schematically in side elevation and bottom plan views preferred forms of track-following rollers which may be connected to the base assemblies of FIGS. 9 and 13.
Figure 14B:
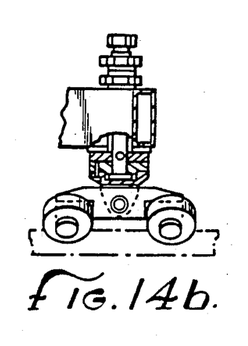
Figure 14C:
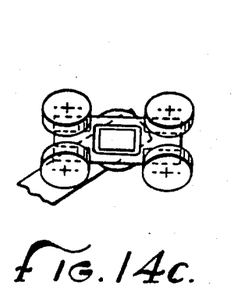
Figure 14D:
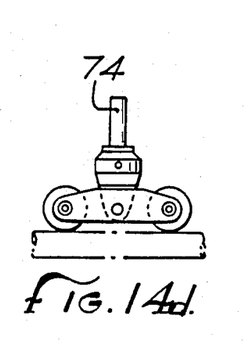
Figure 14E:
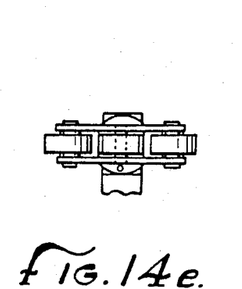

Thus, as shown in FIGS. 1 and 1a, the four legged base assembly may for example be provided with four castors 60, whilst the three legged base assembly 3' may include feet 61. Alternatively, as shown in FIGS. 14a, 14b and 14c, two or more of the sockets may instead be provided with track following roller assemblies 63 each of which comprises rollers orientated at 90° to one another to define an inverted "V" for engagement over a rail 64. As shown in FIGS. 14a, 14d and 14e, the socket on the other side of the base assembly is provided with a further roller assembly for engagement with a second rail 65 and thus the base assemblies are preferably dimensioned such that in this configuration the assembly can run on a track of standard width. However, in a further arrangement, the roller assembly 66 on the right hand side of FIG. 14a could be replaced by a castor of appropriate height, whereby the second track 65 could be omitted and the base would then run along for example a simple length of hose of suitable diameter or alternatively along a scaffold rail. The illustrated system lends itself either to manual or computer controlled automated operation. Thus the camera support means carried by the platform 6 may include either hand wheels or electric servo motors for remote control or automated operation. The castors or roller assemblies may also be driven so that movement of the base assembly can be automated.

It will be appreciated that not all of the illustrated components need be provided in any one camera support system, and indeed a number of the aspects and features discussed above are 10 advantageous in their own right. For example the provision of extension members for the boom arm which are compatible with coupling means for the vertical support column is advantageous regardless of whether the system also adapts to provide a monopod type support. Conversely, an interface such as that shown in FIG. 5 might be provided together with a fulcrum unit in a system having only a single support column member and a single length boom arm. The column base assemblies are also advantageous in their own right, and might be used independently of the other advantageous aspects of the system. Other novel features and aspects of the system disclosed herein, as for example the preferred form of the coupling means, may be applicable more generally to camera support systems not including any of the other characteristic features of the system identified above and the disclosure hereof should be construed accordingly.

I claim:

1. A camera support system comprising a vertical support column and a boom arm mounted for pivotal movement on the support column, the boom arm having a free end for carrying a camera, the boom arm including at least one extension member detachably interconnectable thereto to extend the length of the boom arm, said extension member also being detachably interconnectable with the support column for selectively increasing the total height of such column, and two interchangeable central sections of different lengths are provided for the boom arm, said central sections being of stronger construction than the extension members and being selectively interchangeable in the support column.

2. The system of claim 1 comprising a plurality of extension members each adapted for selective interconnection with the boom arm or support column.

3. The system of claim 2 comprising extension members of differing lengths.

4. The system of claim 1, 2 or 3 further comprising means for mounting weight lifters type weights to the end of the boom arm as a counter-balance assembly therefor.

5. The system of claim 1,2 or 3 comprising a generally "L"shaped camera support platform which is invertably mounted to the end of the boom arm.

6. The system of claim 1, 2 or 3 further comprising a slewing ring interchangeable with the support column.

7. The camera support system of claim 1,2 or 3 including a fulcrum unit for pivotally mounting a boom arm to the support column and a camera interface unit for directly coupling the support column to a camera, said fulcrum and interface units being interchangeable with the upper end of the support column whereby the system may be used either in a crane type or in a monopod type configuration.

8. The camera support system of claim 7 wherein a main column member forming part of the support column is of adjustable length enabling fine adjustment of camera height.

9. A camera support system comprising a vertical support column and a boom arm mounted for pivotal movement on the support column, the boom arm having a free end for carrying a camera, the boom arm including at least one extension member detachably interconnectable thereto to extend the length of the boom arm, said member also being detachably interconnectable with the support column for selectively increasing the total height of such column, and a generally "L" shaped camera support platform which is invertably mounted to the end of the boom arm, wherein the camera support platform is pivotal about a horizontal axis with respect to the boom arm and is coupled to a fulcrum unit mounting the boom arm to the support column by means of a plurality of interengaged link members arranged so that the platform is pivoted in an equal and opposite sense to the boom arm so as to remain horizontal, the lengths of said link members matching the lengths of the extension members of the boom arm.

10. A camera support comprising a vertical support column, and a boom arm mounted for pivotal movement on the support column, the boom arm having a free end for carrying a camera, the boom arm including at least one extension member detachably interconnectable thereto to extend the length of the boom arm, and said member also being detachably interconnectable with the support column for selectively increasing the total height of such column, coupling means for interconnecting each extension member to the support column or boom arm or with other components of the system, said coupling means having matingly engaging male and female parts which are clamped together by means of a threaded locking ring, and a ratchet locking mechanism for cooperating with the ring in tis tightened condition to prevent loosening thereof, the ratchet mechanism being manually releasable when it is desired to disengage the ring to permit separation of the parts.

11. The system of claim 1, 2, 3, 9 or 10 further comprising a camera interface unit for directly coupling the camera to the support column, such interface unit being interchangeable with a fulcrum unit for pivotally mounting the boom arm to the column, whereby the system may be used either in a crane type or monopod type configuration.

12. A camera support system comprising a vertical support column, a fulcrum unit for pivotally mounting a boom arm to the support column, a camera interface unit for directly coupling the support column to a camera, said fulcrum and interface units being interchangeably interconnectable with the upper end of the support column whereby the system may be used either in a crane type or in a monopod type configuration, coupling means for interconnecting the support column to the fulcrum or interface units, said coupling means having matingly engaging male and female parts which are clamped together by means of a threaded locking ring, and a ratchet locking mechanism which co-operating with the ring in tis tightened condition to prevent loosening thereof, the ratchet mechanism being manually releasable when it is desired to disengage the ring to permit separation of the parts.

13. The camera support system of claim 12 wherein a main column member forming part of the support column is of adjustable length enabling fine adjustment of camera height.

14. The camera support system of claim 1, 2, 3, 9, 10 or 12 including a base assembly for mounting the support column, said base assembly comprising means for interchangeably mounting thereon ground engaging feet or ground engaging multi-directional castors or track following rollers, said means being arranged so that the height of at least one said foot, castor, or roller with respect to the base assembly may be individually adjusted.

15. The camera support system of claim 14 wherein said track following rollers are of a bogey type and include pairs of rollers orientated with respect to one another so as to define an inverted "V" shape.

16. The camera support system of claim 14 wherein said base assembly includes legs extending outwardly from a central support member to which the column base is secured, the legs being pivotally mounted at their inner ends about substantially vertical axes for selectively extending for use and folding into a more compact configuration for storage.

* * * * *